United States Patent [19]

Broadway

[11] 3,997,142
[45] Dec. 14, 1976

[54] PRESSURE SENSITIVE AND TEMPERATURE RESPONSIVE ROTARY VALVE

[75] Inventor: William W. Broadway, Houston, Tex.

[73] Assignee: FMC Corporation, San Jose, Calif.

[22] Filed: Apr. 21, 1975

[21] Appl. No.: 570,122

[52] U.S. Cl. .............................. 251/307; 251/317
[51] Int. Cl.² .......................................... F16K 1/22
[58] Field of Search .......... 251/306, 307, 316, 317, 251/173; 277/26

[56] References Cited

UNITED STATES PATENTS

| | | | |
|---|---|---|---|
| 3,127,182 | 3/1964 | Wardleigh | 251/306 X |
| 3,726,504 | 4/1973 | Kormos | 251/306 |
| 3,726,505 | 4/1973 | Williams | 251/307 |
| 3,801,066 | 4/1974 | Miles | 251/306 |

Primary Examiner—Harold W. Weakley
Attorney, Agent, or Firm—W. W. Ritt, Jr.; C. E. Tripp

[57] ABSTRACT

A rotary valve for providing control of fluid flow throughout a wide range of pressures and temperatures. The valve includes a pressure sensitive and temperature responsive annular yieldable seat that cooperates with the valve's flow control element to establish a fluid seal, and a temperature responsive rigid energizer ring for maintaining both a radial and an axial load on the seat at all temperatures. The valve seat includes an annular, radially outwardly extending leg that is held in position against a radial surface of the valve's body by the energizer ring, and at least one pressure sensitive annular sealing lip that extends in a generally axial direction from the leg and in contact with the valve's flow control element when the valve is closed. The energizer ring has a generally wedge-shaped cross-sectional configuration and is held in position in the valve body by a retainer ring that is releasably secured, as by screws, to the valve body for quick and easy servicing of the seat. The energizer ring has a frusto-conical radial surface that cooperates with a corresponding surface on the retainer ring to maintain the energizer ring constantly wedged tightly against the valve seat, thereby assuring that the seat is retained securely in the valve body and is continually forced against the valve's flow control element throughout the entire range of operating temperatures and pressures. The rotational axis of the flow control element is offset from the valve's flow passage axis, and the valve's shaft is displaced from the valve seat along that same axis, thereby reducing thrust load on the flow control element, scuffing of the valve seat, and torque required to open and close the valve.

7 Claims, 14 Drawing Figures

FIG_1

FIG_3

FIG_4

FIG_5

FIG_2

FIG_10

FIG_6

FIG_7

FIG_8

FIG_9

FIG_11

FIG_12

FIG_13

FIG_14

PRESSURE SENSITIVE AND TEMPERATURE RESPONSIVE ROTARY VALVE

BACKGROUND OF THE INVENTION

This invention relates to rotary valves, and more particularly to butterfly valves with annular seats especially for use under a wide range of temperatures and pressures. Prior art on valves of this type can be found in Class 251 of the classification system of U.S. patents.

Butterfly and other types of rotary valves with annular yieldable seats constructed of Teflon, Kel-F, and other polymeric materials, are well-known and commonly used for controlling the flow of various fluids in a wide variety of industries. Although some of these valves are satisfactory when employed at ambient or moderate temperatures and modest pressures, experience has shown that seats of this type employed in butterfly valves often leak when exposed to extreme temperatures, either elevated or cryogenic, for these seats, like most all other solid material, expand when heated and contract when cooled. This volume change affects all of the dimensions of the seat, and since the extent of expansion or contraction is also dependent upon the material from which the seat is constructed, it is quite difficult to provide a butterfly valve seat that will maintain a fluid-tight seal over a wide range of temperatures when subjected to significantly elevated pressures.

Although seats of yieldable polymeric material are considered to be the most suitable for use in butterfly valves that may be subjected to wide ranges of temperature, when the valve is exposed to extreme cold, as encountered in cryogenic applications, there is a tendency for the seat to shrink away from the metallic valve elements between which it is secured, thereby establishing a leakage path. Another complication is presented if the butterfly valve's disc is opened while the valve is being cooled down, for in this situation the seat tends to contract and warp out of its circular form. Maintaining the opened valve at cryogenic temperatures causes the seat element to stiffen in its warped form, thereby making it very difficult, if not impossible, for the seat to return to its circular shape when the valve is closed, and thus the leakage problem is compounded.

Another problem arises when yieldable polymeric valve seats are subjected to elevated temperatures considerably above ambient. Under such conditions there is a tendency for all the vavle elements to expand, thereby causing excessive interference between the seat and the valve disc, and thus detrimentally affecting the operation of the valve. Furthermore, experience has shown that application of a constant pressure load on the valve at elevated temperatures causes the polymeric seat to exhibit a gradual tendency to flow or creep, even at stresses below the seat's proportional limit.

Earlier attempts to overcome these problems include the use of mechanical springs, fulcrum systems, etc., with or without temperature responsive members, to press the seat against the valve disc and thereby hopefully to eliminate leakage. However successful these prior art solutions might be, the fact remains that the use of springs at extreme temperatures is undesirable because they tend to lose some of their important physical characteristics. For example, when metal springs are exposed to cryogenic temperatures they become stiff and brittle; they could break and thereby permanently disable the valve. When some metal springs are exposed to greatly elevated temperatures they frequently become plastic and lose their ability to exert sufficient pressure on the valve seat to maintain seal integrity. In some cases the prior seat energizing devices take a permanent set and thus fail to exert the required force on the seat when the temperature is lowered, thereby allowing the valve to leak. Furthermore, many of the seat energizing devices heretofore known are unduly complicated, and relatively expensive to manufacture.

Accordingly, one object of the present invention is to provide an improved pressure sensitive, temperature responsive rotary valve.

Another object of the present invention is to provide an improved rotary valve seat having sealing surfaces that are dynamically enlarged in response to an increase in fluid pressure and/or a change in temperature, thereby improving the coaction of the seat with the sealing surface of the valve's flow control element.

Another object of the present invention is to provide a new type of energizer for a yieldable seat in a rotary valve, the energizer providing uninterrupted constant pressure on the seat throughout a wide range of temperatures.

Another object of the present invention is to provide an improved rotary valve seat energizer that pressurizes the seat in both radial and axial directions to maintain the seat element in fluid-tight contact with the valve's flow control element at all operating conditions.

Another object of the present invention is to provide an improved butterfly valve with a yieldable seat and a rigid seat energizer that cooperate to provide a constant fluid pressure barrier with the valve's flow control disc without necessitating a significant increase in torque to open or close the valve when high pressures and/or high or low temperatures are encountered.

Another object of the invention is to provide an improved means for preventing diametric movement of a yieldable polymeric valve seat when the seat is exposed to cryogenic temperatures, thus avoiding excessive build up of frictional break-away forces caused by shrinkage of the seat against the valve's flow control element.

Yet another object of the present invention is to provide a new type of energizer ring for a yieldable rotary valve seat, the ring preventing undue distortion of the sealing surfaces of the seat while the valve is subjected to low temperatures when in the open position.

Another object of the present invention is to provide a new means for mechanically loading a yieldable annular seat for a rotary valve, the loading means preventing the escape of fluid to the downstream side of the valve when the valve is exposed to high temperature fluids.

Still another object of the present invention is to provide an improved means for confining a yieldable seat in a rotary valve so that creep of the seat is prevented when the valve is exposed to fluid at high temperature and high pressure.

Additional objects of the present invention will become apparent from the following description of the invention.

SUMMARY OF THE INVENTION

Considered broadly, the present invention comprises a butterfly or other type of rotary valve with a yieldable annular seat of novel cross sectional configuration, and a rigid seat energizer ring also of novel cross sectional configuration, the energizer ring cooperating in a unique manner with a seat retainer ring to provide a constant pressure both axially and radially on the seat, thereby maintaining the seat in fluid-tight contact with the valve's flow control element and the valve body throughout a wide temperature and pressure range.

One embodiment of this seat, which embodiment functions to prevent fluid flow in either direction through the valve, has a cross-sectional shape somewhat like the capital letter "T", with a radially outwardly extending annular leg and a pair of annular sealing lips that extend generally axially from the leg in opposite directions. When the valve is to be used to control fluid flow in only one direction, the seat of this invention has a single annular sealing lip extending generally axially from the leg in an upstream direction. The seat's leg includes annular tang at its radially outer end area that cooperates with the energizer ring to securely retain the seat in proper position in the valve especially during high fluid flow rates through the valve that would tend to pull the seat from its mounting. In both embodiments, the energizer ring continually applies radial and axial pressure on the seat to assure that a fluid-tight seal is maintained between the seat, the valve's flow control element, and the valve body.

The energizer ring of the present invention has a radial surface that bears against the seat's leg, including its tang, and presses it axially against an opposing radial surface of the valve body, thereby securely holding the seat in fluid-tight engagement with the valve body. The opposite radial surface of the erergizer ring is frusto-conical with a slope that diverges from the ring's seat-contacting radial surface in an outward direction, so that in cross-section the ring is generally wedge-shaped in configuration. This frusto-conical surface bears against a corresponding frusto-conical or sloping surface on a retainer ring that is releasably secured to the upstream end of the valve body by bolts, screws, a snap ring, or other suitable means. The retainer ring forms the outer radial wall of the valve's annular seat chamber, while a counterbore in the upstream end of the valve body provides the inner radial wall and the axial wall of this chamber.

The valve seat of the present invention can be comprised of a yieldable polymeric material such as polytrifluorochloroethylene, polytetrafluoroethylene, or other compositions of similar characteristics, all of which are well known for this use as amply verified by the prior art. The energizer ring is constructed of metal or other rigid material that has a satisfactory rate of contraction, i.e., a rate that is significantly different from that of the valve body, the retainer ring, and the valve's disc or other flow control element. Accordingly, when the valve is subjected to a cryogenic temperature, the energizer ring contracts to a greater extent than the valve's body, retainer ring, and flow control element, thereby continuing the radial pressure exerted on the valve seat in a direction towards the flow control element, and assuring that the seal between the seat lips or lip and the flow control element is maintained. During this contraction, the opposed sloping surfaces of the energizer ring and the retainer ring cause the energizer ring to move axially towards the leg of the valve seat element thereby maintaining the fluid seal between the seat and the valve body. Accordingly, no matter how low the temperature might be to which the valve is subjected, the energizer ring continues to exert pressure in both axial and radial directions against the seat to assure that the seal between the seat, the valve body, and the valve flow control element is maintained.

When the valve of this invention is to be used for conducting fluid at high temperatures, the energizer ring is constructed of a material that is more dimensionally stable and that has a coefficient of expansion less than that of the valve body and flow control element. Thus, as the valve body, the flow control element, and the retainer ring expand, the sealing lip of the seat is compressed between the flow control element and the energizer ring, deflecting the lip and increasing the sealing force between the flow control element and the seat by means of a cantilever action. An annular space is provided in the adjacent portion of the valve body and/or retainer ring for accommodating this deflection, but this space is proportioned so that the deflection cannot exceed a preselected amount, thereby preventing unwanted plastic flow or creep of the seat under elevated temperature that could result in reduction of the integrity of the seal.

Both lips of the valve seat of the present invention also are responsive on the pressure side of the valve when in service. This fluid pressure acts on the lip on the upstream side of the valve and thereby supplements the action of the energizer ring against that lip, thus helping to maintain the integrity of the fluid seal.

Since a butterfly valve is not a balanced valve, the static pressure drop across its surface and the impact of the fluid during flow produce a thrust load on the disc that tends to carry the disc downstream. Tests have shown that this thrust load is not evenly distributed on the disc except at its fully opened or fully closed position. At all intermediate positions, the thrust load on the wing of the disc turned toward the upstream side of the valve is greater than that on the downstream wing. To minimize this thrust load problem, the disc shaft of butterfly valves according to the present invention is offset from the flow passage axis, thereby permitting the short wing of the disc to enter the fluid flow first when the valve is installed so that fluid flow is in the intended direction.

In the preferred butterfly valve forms of the present invention the axis of the disc shaft is also displaced axially from the valve seat, so that the seat establishes an unbroken annular seal interface with the disc. This feature facilitates equal sealing forces to be exerted around the entire circumference of the disc, with the result that all points along this circumference including those in the shaft area, lift away from the seat when the valve is opened, and contact the seat when the valve is closed. Thus, there is no pivoting or twisting action exerted against the valve seat, and the valve therefore can be open and closed with very little, if any, scuffing of the seat, and with significantly less torque than would otherwise be needed.

Because damage to the annular seat could result if the valve flow control element were rotated 360° about its shaft axis, the valves according to the present invention also are provided with mechanical stops to prevent overtravel of the flow control element from the fully closed to the fully open position. Furthermore; a stop system for the fully closed position, comprising surfaces on the flow control element and the valve body, is preferably included in valves of this invention to prevent over-rotation of the flow control element past the exact position where ideal sealing is achieved.

Butterfly valves are frequently used for throttling service, i.e., wherein the valve is employed to reduce downstream pressure to some fraction of the prevailing upstream pressure, but is not fully closed to completely shut off flow therethrough. Since the configuration of the seat of this invention could subject it to highly errosive forces when fluid is being throttled through the valve, the invention includes the provision of an annular shoulder or lip on the retainer ring that projects inwardly into the flow channel through the valve in front of the seat. This shoulder or lip causes the fluid to arch over the seat, and thus protects the seat from direct high-velocity impingement by the fluid.

When a valve is employed to control the flow of flammable fluids, it is highly desirable that the valve provide a relatively effective seal even if it is exposed to superambient temperatures such as would prevail during a fire, especially if the temperatures were high enough to char or destroy the seat and other organic elements of the valve, thus releasing the flow of the flammable fluids and increasing the fire danger. By keeping the clearances between the flow control element and the retainer ring very small, as is made possible by the eccentric shaft, leakage will be kept to a minimum under the above described conditions.

DESCRIPTION OF THE PREFERRED EMBODIMENTS

As illustrated in FIGS. 1–9, a butterfly valve 20 incorporating the features of the present invention for controlling fluid flow in either direction includes a generally annular body 22 defining a fluid flow passage 24, the illustrated body being adapted for insertion between opposed standard pipe flanges (not shown). Rotatably supported in the flow passage 24 is a fluid flow control disc 26 with a circumferential sealing surface 28, the surface 28 preferably having a spherical configuration. The disc's sealing surface 28 is adapted to cooperate with an annular valve seat 30 that preferably is formed from a stiff, yet yieldable, polymeric material such as polytrichlorofluoroethylene, polytetrafluoroethylene, or the like. The seat 30 resides in an annular seat chamber 32 formed by a counterbore in the valve body 22, and a rigid seat energizer or backup ring 34 fits snugly against and lends support to the seat 30. The seat and the energizer ring are retained in the seat chamber 32 by a retainer ring 36 that is releasably secured to the valve body 22 by bolts 38 or other suitable means, the bolts applying a sufficient axial load on the retainer ring 36 to effect a fluid seal between the seat and the valve body, and also facilitating quick and easy installation or removal of the seat without necessitating removal of the disc 26 or otherwise disassembly of the valve. When the seat 30 is being installed, the valve should be in its illustrated fully closed condition since the seat is free-floating and thus will center itself diametrically against the disc 26 and thus establish a complete, unbroken sealing interface with the disc's spherical surface 28.

The outer radial surface 40 of the energizer ring 34 is frusto-conical in configuration and diverges away from the ring's inner radial surface 42 in a radially outward direction, so that the energizer ring has a generally wedge-shaped configuration in cross-section. The inner radial surface 44 of the retainer ring 36 is complementary in shape to the outer surface 40 of the energizer ring 34, thus also being frusto-conical. These mating frusto-conical or sloping surfaces 40, 44 cause the energizer ring 34 to move in an axial direction towards the seat 30 as the energizer ring contracts or shrinks inwardly toward the flow passage axis when the temperature of the valve is lowered. Accordingly, no matter how low the temperature might be to which the valve 20 is subjected, the seat 30 is always held in a fluid-tight manner against the valve body 22.

The seat 30 has an outwardly extending annular leg 46 that preferably includes an annular tang 48 (seen best in FIGS. 6–9), this tang cooperating with a mating surface 49 on the energizer ring 34 to prevent dislodgement of the seat from its correct position when, for example, the rate of fluid flow through the valve is quite high.

As illustrated best in FIGS. 6–9, the seat 30 of this embodiment of the present invention has a pair of annular sealing lips 50, 52 that extend in opposite directions, from the leg 46 and generally axially along the spherical sealing surface 28 of the disc 26. The forward sealing lip 50 establishes a thin annular fluid-tight contact with the disc surface 28 when the valve is closed indicated by arrows A in FIG. 6), and when the closed valve is subjected to fluid pressure on the intended upstream side (indicated by arrow B in FIG. 7) the width of this annular contact is significantly increased due to fluid pressure freely entering the pressure actuating cavity 54 and urging the lip 50 radially inwardly against the disc's seal surface 28, thereby intensifying the fluid barrier between the disc 26 and the seat 30. In like manner, and as will be readily understood, if the valve 20 is subjected to fluid pressure from the opposite direction (not illustrated), the annular contact (arrows D, FIGS. 6–9) between the seat's rear sealing lip 52 and the disc's sealing surface 28 also will increase in width in response to the fluid force exerted on the lip 52. Accordingly, the valve 20 with a dual-lip seat 30 will satisfactorily function to prevent fluid flow in either direction.

If the valve 20 is subjected to low temperatures, for example where it is used to control the flow of cryogenic fluids, the seat 30 would have a tendency to shrink away from the disc 26. However, and in accordance with the present invention, by selecting materials for the energizer ring 34 that have the proper differential expansion rate, the ring 34 can be constructed to respond to any temperature lowering such that it will actually increase the pressure it applies to the seat 30, both axially and radially, as a function of temperature. For example, if the valve body 22 and the retainer ring 36 are constructed of metal having a relatively low contraction rate or coefficient, such as type 316 stainless steel, and if the energizer ring 34 is constructed of aluminum or other metal with a relatively high coefficient or rate of contraction, the results would be as diagrammatically indicated in FIG. 8, wherein the energizer ring 34 contracts at a faster rate and to a greater extent than the retainer ring 36. This causes the energizer ring 34 to migrate along the sloping surface 44 of the retainer ring, and results in an increase in pressure exerted by the energizer ring 34 against the seat 30, both radially and axially. Thus, the energizer ring 34 is able to compensate for the shrinkage of all the other elements of the valve 20 while maintaining, and possibly even increasing, the load it exerts on the seat 30. Of course, and as will be readily understood, the slope or angle of the mating frusto-conical surfaces 40, 44 has an influence on the extent of relative movement between the energizer ring 34 and the retainer ring 36, and that by increasing this slope a greater load will result on the seat 30, whereas decreasing the slope will reduce this load.

It can be readily appreciated that when the valve 20 is employed in cryogenic service, for example to control the flow of liquefied natural gas with a 600:1 expansion ratio, any fluid entrapped around the seat 30 very likely might have a damaging effect on the seat as the valve is warmed. To obviate this problem, the valve 20 is provided with vent passages 56, 58, 60 (FIG. 1) between the valve body 22 and the seat 30, energizer ring 34, and retainer ring 36, thereby facilitating free flow of liquids and gases to and from the outer end of the seat's leg 46.

Figure 9:
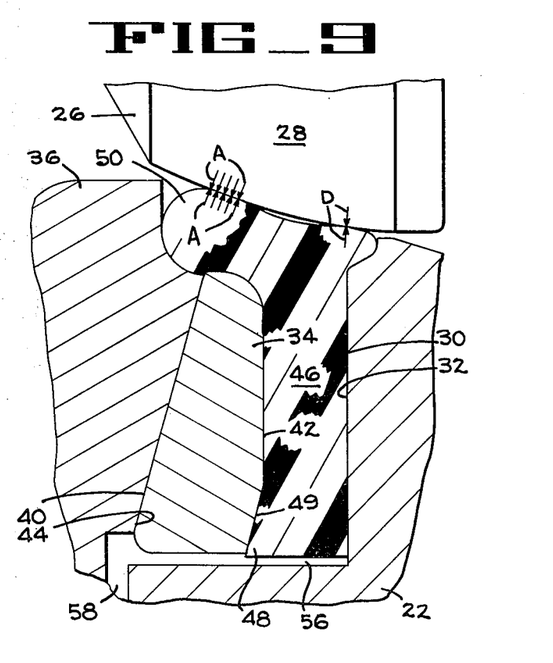
FIG. 9 is a view like FIG. 7, but wherein the valve is at elevated temperature.
Figure 10:
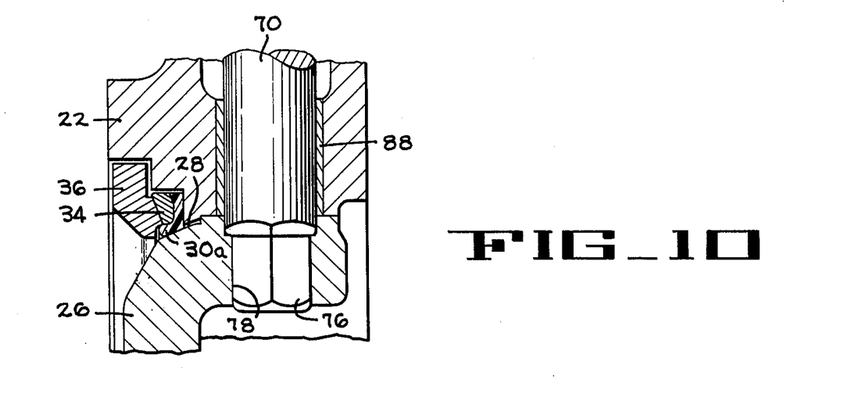
FIG. 10 is a fragmentary sectional view of a modified version of the valve of FIGS. 1–9, wherein the seat has a single lip for sealing only in a single flow direction.

When the valve 20 is employed to control flowing fluid at elevated temperatures, the valve's elements will expand as they increase in temperature from ambient. In order that this expansion will not be so great as to cause excessive interference between the disc 26 and the seat 30, and thereby increasing the amount of torque required to open and close the valve, the energizer ring 36 preferably is constructed of a metal that is more dimensionally stable than aluminum for example Invar. With such a relatively dimensionally stable energizer ring in a valve that otherwise is constructed of the same materials as that employed for cryogenic service, as the retainer ring begins expanding it will move outwardly along the sloping frusto-conical surface 44 of the energizer ring 36. However, as the disc 26 expands, it will force the seat radially against the energizer ring 34 causing the pressure-sensitive sealing lips 50, 52 to be deflected radially outwardly, and thus through a cantilever action increase the intensity of the seal between the disc and the seat. If the deflection of the lips 50, 52 is of sufficient magnitude, they will come into contact with the retainer ring 36 and valve body 22, respectively, as is illustrated in FIG. 9, and will thus be prevented from creeping or flowing as would otherwise occur if they were not retained in this manner.

Figure 11:
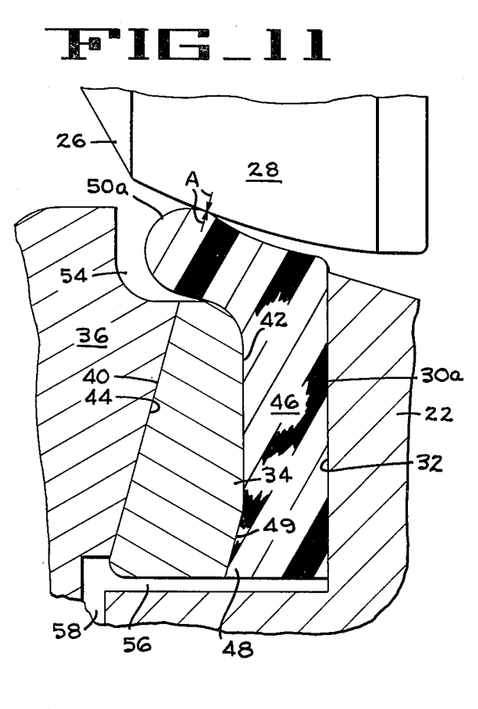
FIG. 11 is a view like FIG. 6, showing the valve of FIG. 10 closed and under no fluid pressure.
Figure 12:
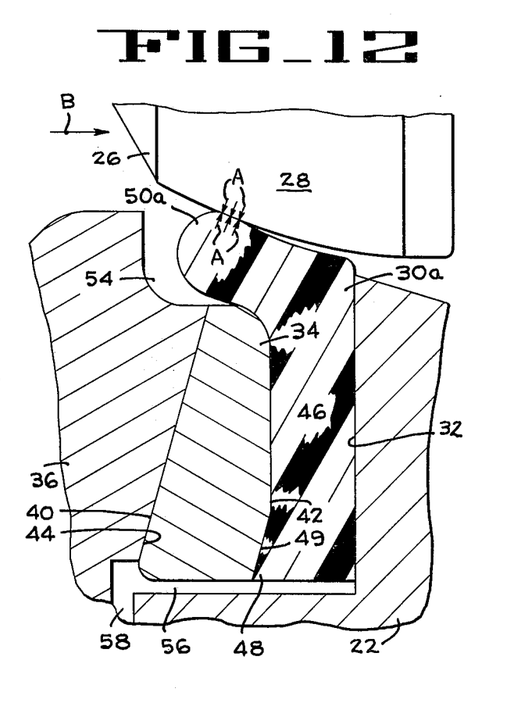
FIG. 12 is a view like FIG. 11, but showing the valve under fluid pressure in the intended direction.
Figure 13:
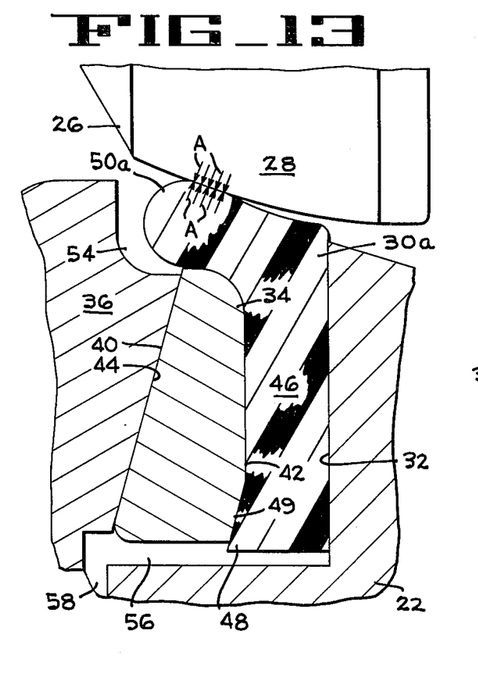
FIG. 13 is a view like FIG. 11, but showing the valve at low temperature.
Figure 14:
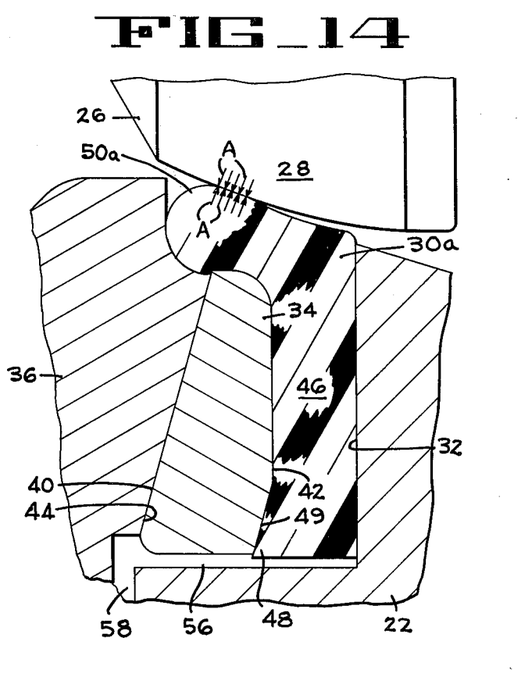
FIG. 14 is a view like FIG. 11, but showing the valve at elevated temperature.

When the valve 20 is to be employed for controlling fluid flow in only one direction, a modified form 30a (FIGS. 10–14) of seat 30 can be used, the seat 30a having but a single pressure-sensitive sealing lip 50a. In all other respects, the elements of the valve 20 can remain unchanged. The response of the seal's lip 50a to closure of the disc 26 in the absence of fluid pressure (FIG. 11), the subjection of the closed valve to upstream fluid pressure (FIG. 12), the use of the valve in cryogenic service (FIG. 13), and the use of the valve at high temperatures (FIG. 14) is essentially identical to that of the lip 50 of the seat 30 under these same conditions.

In order to minimize the resistance to fluid flow through the valve 20, a two piece valve shaft (FIG. 1) comprising upper element 70 and lower element 72 is employed with the disc 26. The upper shaft element 70 has a hexagonal lower end 76 that is axially slidably received in a complementary hexagonal socket 78 in the disc 26, while the lower shaft element 72 is secured to the disc by means of a roll pin 79 in the well-known manner. The upper shaft element 70 is retained in the bonnet portion 80 of the valve body 22 by a snap ring 82 that fits in a groove 84 in a counter bore of the bonnet, and a cooperating radial flange 86 on the upper shaft 70. The upper and lower shaft elements 70, 72 are supported in the valve body by upper and lower sleeve-type bearings 88, 90 respectively, which bearings can be constructed of a bronze backing strip, an intermediate section of porous bronze filled with a mixture of polytetrafluoroethylene and lead, and a thin surface layer of the same polymer-lead mixture. Thus any torque created by a valve actuating mechanism is transmitted by the upper shaft element 70 to the disc 26 and subsequently to the lower shaft element 72, assuring that both shaft elements and the disc rotate in unison as the valve is opened or closed. Furthermore, no matter in which direction fluid pressure is applied to the disc 26, the shaft bearings 88, 90 fully support the pressure load, assuring no loading of the seat 30 by the disc 26. In addition, the upper shaft bearing 88 functions as a fluid barrier, preventing the free flow of liquid upwardly in the valve's bonnet 80, and for this reason this bearing is located in the constant cross-section of the valve body to facilitate stable and even cooling of this bearing when the valve is exposed to cryogenic fluids, thereby preventing excessive leakage due to distortion.

Figure 1:
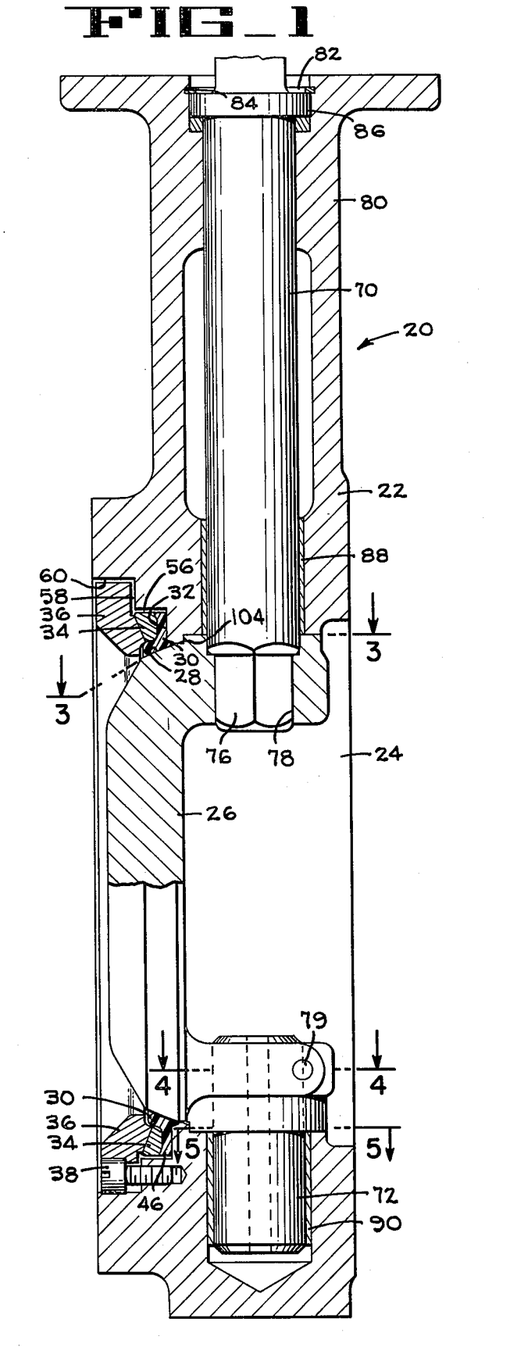
FIG. 1 is a central vertical section of a butterfly valve embodying the features of the present invention, the valve having a seat with lips for sealing in both flow directions.
Figure 2:
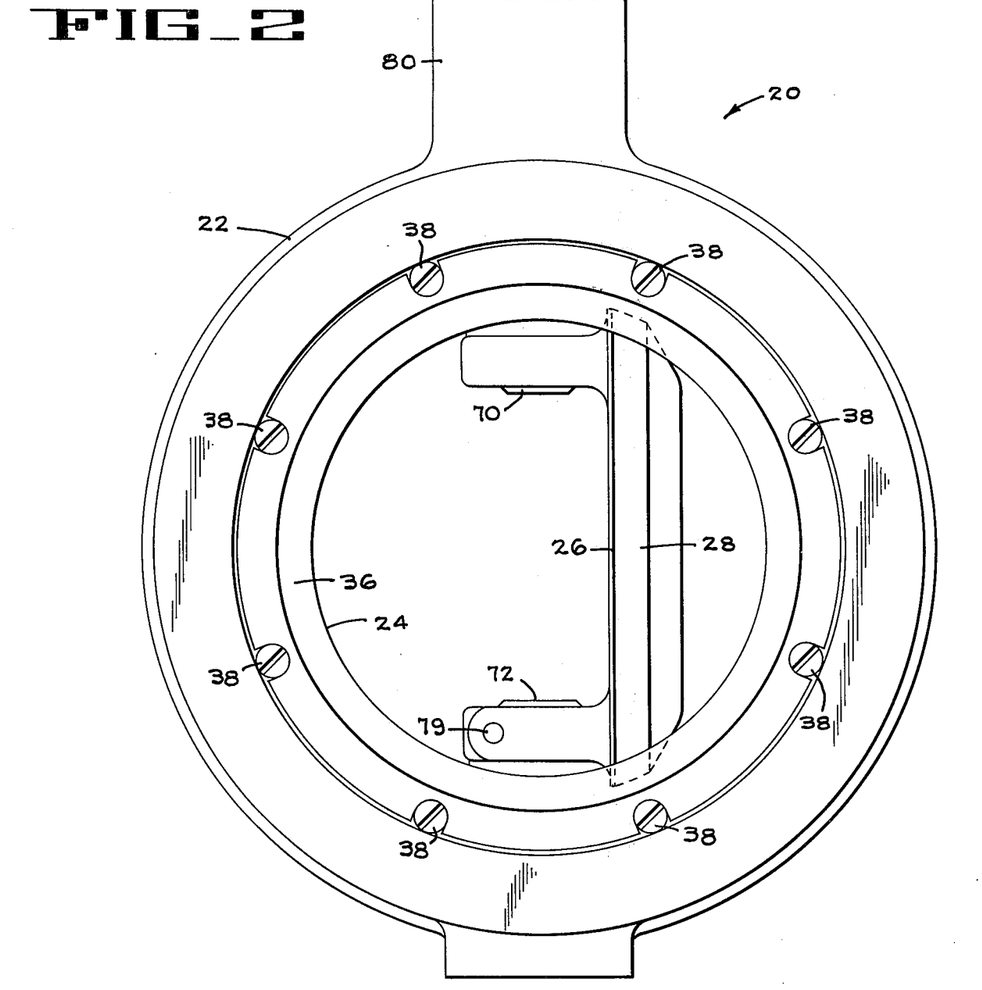
FIG. 2 is a partial and elevation of the valve of FIG. 1.
Figure 3:
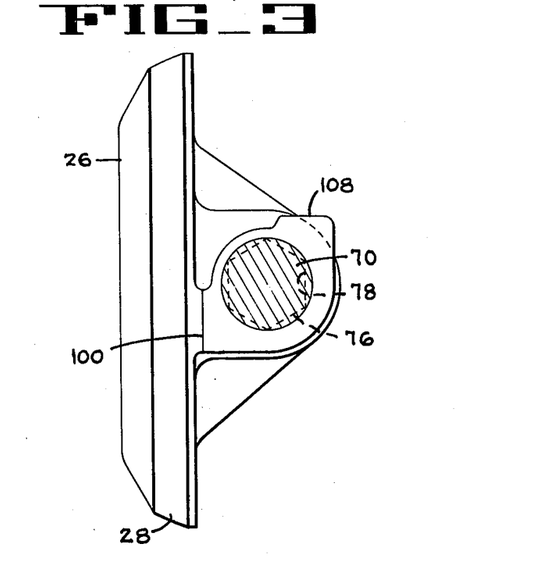
FIG. 3 is a section taken along the line 3—3 of FIG. 1.
Figure 4:
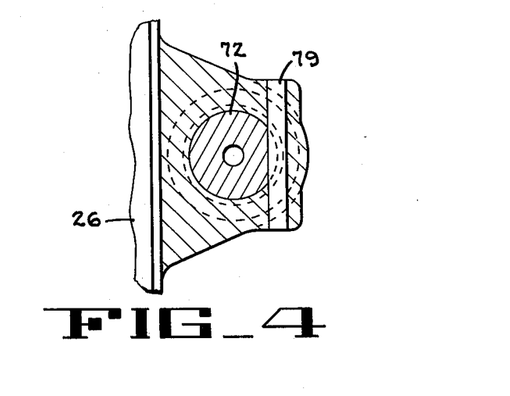
FIG. 4 is a section taken along the line 4—4 of FIG. 1.
Figure 5:
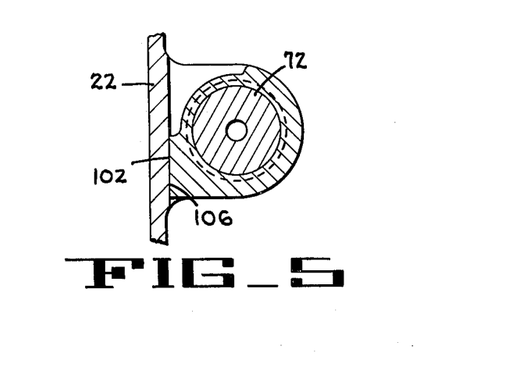
FIG. 5 is a section taken along the line 5—5 of FIG. 1.
Figure 6:
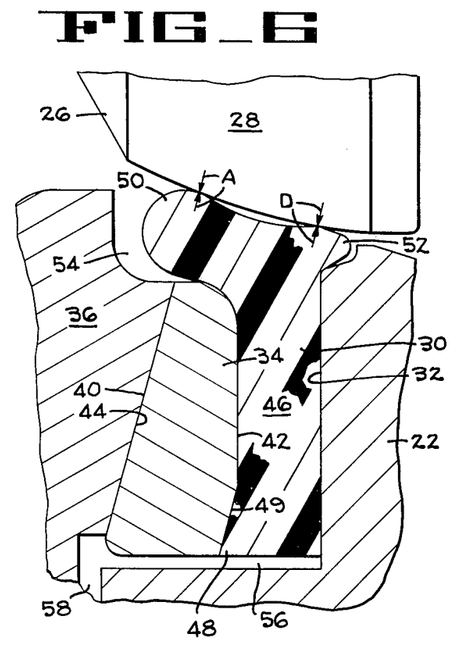
FIG. 6 is a fragmentary sectional view, on an enlarged scale, of the disc, the body, the seat, the energizer ring, and the retainer ring of the valve of FIGS. 1–5, illustrating the relationship of these elements when the valve is closed, but under no fluid pressure.
Figure 7:
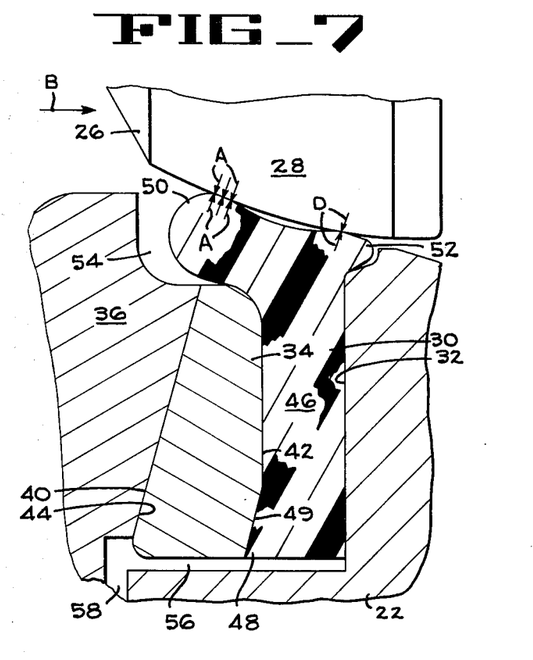
FIG. 7 is a view like FIG. 6, illustrating the relationship of the elements when the closed valve is under fluid pressure in the intended direction.
Figure 8:
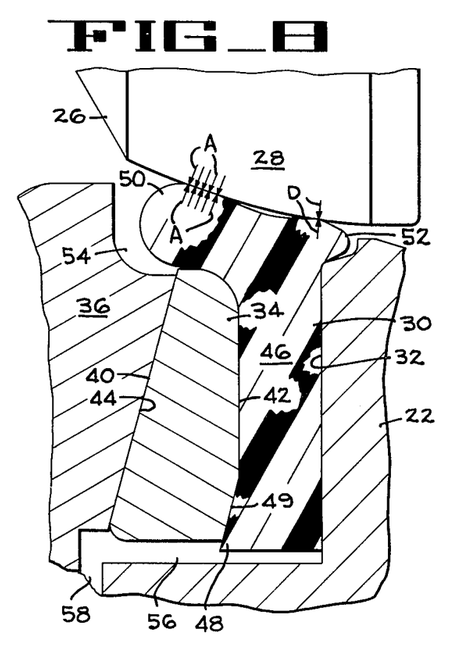
FIG. 8 is a view like FIG. 7, but wherein the valve is at low temperature.

As seen best in FIGS. 1, 3 and 5, the valve disc 26 is provided with upper and lower stop surfaces 100, 102, respectively, that cooperate with complementary upper and lower stop surfaces 104, 106, respectively, on the valve body 22, to assure that the valve disc when closed will be in the optimum position with respect to the seat 30, and thus establish with the seat a fluid seal of maximum integrity and strength. In order that the disc 26 cannot be rotated beyond its fully opened position, the disc also is provided with a stop surface 108 (FIG. 3) that cooperates with the valve body stop surface 104 to halt disc rotation in the opening direction at a point where the disc is disposed 90 degrees from its closed position. The stops 100, 102, 104, 106 preferably are precision machined so that exact positioning of the disc 26 is achieved when the valve is closed.

Although the present invention has been described as embodied in a butterfly valve, it should be understood that the invention also can be utilized in other types of rotary valves, and therefore is not restricted in application to the foregoing constructions.

Although the best mode contemplated for carrying out the present invention has been herein shown and described, it will be apparent that modification and variation may be made without departing from what is regarded to be the subject matter of the invention.

I claim:
1. A rotary valve comprising, in combination,
   a. a generally annular valve body defining a fluid flow passage,
   b. a fluid flow control element rotatably supported in the flow passage for controlling the flow of fluids through the valve,
   c. an annular yieldable, pressure-responsive valve seat positioned in the flow passage for cooperation with the flow control element to establish a fluid flow barrier through said passage,
   d. a temperature-responsive valve seat energizer ring positioned in the flow passage for imposing a force on the valve seat to cause said seat to establish a fluid-tight seal with the flow control element and the valve body, said energizer ring having an annular frusto-conical surface, and
   e. means for retaining the energizer ring in position against the valve seat, said retaining means including a frusto-conical surface complementary to and in contact with the energizer ring frusto-conical surface, said energizer ring having a coefficient of contraction greater than the coefficient of contraction of said valve body and energizer ring retaining means, whereby when the valve is subjected to a reduction in temperature the energizer ring contracts more than the valve body and retaining means and the aforesaid frusto-conical surfaces cooperate to cause radial and axial movement of the energizer ring with respect to the valve body and retaining means to exert a seal-effecting force both radially and axially on the valve seat, thereby to maintain the established fluid flow barrier through said passage.

2. A rotary valve according to claim 1 wherein the valve seat comprises a leg portion extending generally radially outwardly from the flow passage, and at least one pressure-responsive sealing lip extending in a generally axial direction from the leg portion along the flow control element when said element is in its closed position.

3. A rotary valve according to claim 1 wherein the valve seat comprises two pressure-responsive annular sealing lips extending in opposite directions from the leg portion of said valve seat.

4. A rotary valve according to claim 1 wherein the energizer ring remains dimensionally stable when exposed to temperatures well above ambient.

5. A rotary valve according to claim 1 wherein the valve seat includes a concave surface that diverges radially outwardly away from the adjacent surface of the flow control element when the valve is closed, whereby sealing contact between the flow control element and the valve seat as the valve is closed begins with annular thin-line contact and subsequently varies progressively in response to increased fluid pressure, thereby causing the area of said sealing contact to increase with an increase in said fluid pressure.

6. A rotary valve according to claim 1 wherein the flow control element is rotatably mounted on an axis that is offset radially from the axis of the flow passage, and offset along said flow passage axis from a plane through said flow control element.

7. A rotary valve according to claim 1 wherein the energizer ring cooperates with the retainer means to vary the magnitude of sealing contact of the valve seat with the flow control element in response to temperature cycling.

* * * * *

UNITED STATES PATENT OFFICE
CERTIFICATE OF CORRECTION

Patent No. 3,997,142                      Dated December 14, 1976

Inventor(s) William W. Broadway

It is certified that error appears in the above-identified patent and that said Letters Patent are hereby corrected as shown below:

Col. 1 line 50, "vavle" should be --valve--

Col. 2 line 41, after "the" insert therefore --present--

Col. 3 line 37, "erergizer" should be --energizer--

Signed and Sealed this

Ninth Day of October 1979

[SEAL]

Attest:

RUTH C. MASON
Attesting Officer

LUTRELLE F. PARKER
Acting Commissioner of Patents and Trademarks